(12) United States Patent
Mahalli

(10) Patent No.: US 8,011,463 B1
(45) Date of Patent: Sep. 6, 2011

(54) FLEXIBLE AND EFFICIENT ENERGY SOURCE

(76) Inventor: Yahya Mahalli, Commack, NY (US)

( * ) Notice: Subject to any disclaimer, the term of this patent is extended or adjusted under 35 U.S.C. 154(b) by 393 days.

(21) Appl. No.: 12/343,040

(22) Filed: Dec. 23, 2008

Related U.S. Application Data

(60) Provisional application No. 61/016,484, filed on Dec. 23, 2007.

(51) Int. Cl.
*B60K 1/00* (2006.01)

(52) U.S. Cl. ............ 180/65.31; 180/65.21; 180/65.265; 180/65.275; 180/65.285

(58) Field of Classification Search ............... 180/65.21, 180/65.265, 65.275, 65.285, 65.31
See application file for complete search history.

(56) References Cited

U.S. PATENT DOCUMENTS

| | | | |
|---|---|---|---|
| 5,191,766 A | 3/1993 | Vines | |
| 6,202,782 B1 | 3/2001 | Hatanaka | |
| 6,230,496 B1 | 5/2001 | Hofmann et al. | |
| 6,630,113 B1 | 10/2003 | Surma | |
| 7,430,865 B2 * | 10/2008 | Filippone | 60/618 |

* cited by examiner

*Primary Examiner* — J. Allen Shriver, II
*Assistant Examiner* — Erez Gurari
(74) *Attorney, Agent, or Firm* — David Aker

(57) ABSTRACT

An energy source includes an internal combustion engine with a cooling jacket in which a vapor of a working medium (steam in the case of water) is generated; a turbine connected to receive the vapor from the cooling jacket and having a rotating component rotated by the passage of the vapor; a generator rotated in response to rotation of the rotating component to generate electricity; and a heating coil powered by electricity produced by the generator, the heating coil being disposed to heat the medium in the cooling jacket to assist in providing vapor. The energy source may be used in a motor vehicle, and the steam (when water is used as the working medium) and the generated electricity can be used as energy sources for external loads, such as heating and powering a building.

20 Claims, 1 Drawing Sheet

FLEXIBLE AND EFFICIENT ENERGY SOURCE

This application claims priority under 35 U.S.C. §119(e) from provisional patent application Ser. No. 61/016,484 filed on Dec. 23, 2007, incorporated herein by reference, for all purposes, in its entirety.

BACKGROUND OF THE INVENTION

1. Field of the Invention

The present invention relates to apparatus for the production of energy for use in an automobile or elsewhere. More particularly, it relates to those apparatus wherein energy is readily converted from one form to another to allow flexible use of various energy sources in an efficient manner.

2. Background Art

Generally, there have been a variety of technologies that have been suggested for increased efficiency in the utilization of fuels in, for example automobiles. Hybrid technology, including the combination of a gasoline engine, an electrical generator, and an electric motor is gaining fairly widespread acceptance. While a hydrogen based fuel system is also being considered, there is no real infrastructure in place to support the technology on a widespread basis, or for sustained use.

There have been some attempts to utilize older technologies in combination with new ones, such as disclosed in U.S. Pat. Nos. 5,191,766, 6,202,782 and 6,230,496. The first of these attempts to use steam, generated by cooling an internal combustion engine, to power turbines which may be connected to augment the power supplied by the internal combustion engine, or to act as a power transfer medium.

SUMMARY OF THE INVENTION

It is an object of the invention to provide energy by integration of older and new technologies in a flexible and efficient manner.

It is a further object of the invention to provide a power plant that may be used in vehicles normally powered by internal combustion engines.

It is another object of the invention to provide a power plant that can use internal combustion, electric, steam and hydrogen technologies.

These objects and others are achieved in accordance with the invention by integrating internal combustion, electric, steam and hydrogen technologies to provide flexibility with respect to the fuel used and to increase efficiency.

In accordance with the invention, an energy source comprises an internal combustion engine configured to utilize waste heat to vaporize a working medium, such as refrigerant medium or water, to generate vapor; a turbine connected to receive the vapor, whether that of a refrigerant or steam, and having a rotating component rotated by the passage of the vapor or steam; a generator rotated in response to rotation of the rotating component to generate electricity; and a heating coil powered by electricity produced by the generator, the heating coil being disposed to heat the working medium in the cooling jacket to assist in providing vapor. The internal combustion engine can have a cooling jacket for containing the working medium (refrigerant or water for generating vapor), and cylinders in which fuel is consumed, wherein the cooling jacket cools the cylinders.

The energy source can further comprise electrical energy storage for storing electrical energy produced by the generator; an electrical motor powered by electrical energy from the electrical storage; and a transmission for receiving drive power from both the internal combustion engine and the electrical motor so as to provide rotational drive energy from the energy source.

If the generator produces an alternating current, an A.C. to D.C. converter converts the alternating current to direct current. The transmission is preferably configured to provide drive energy to drive axles for driving wheels of a motor vehicle.

The energy source can further comprise a second electrical generator; a drive gear arrangement for driving the second electrical generator in response to rotation of the drive axles; electrical connections for connecting output of the second generator to the battery to charge the battery upon dynamic braking of a motor vehicle having wheels driven by the drive axles.

The drive gear arrangement can comprise a first rotational input connected to a drive shaft of the internal combustion engine; a second rotational input connected to the electrical motor; a first output connected to the transmission; and a second output connected to the gear drive arrangement.

The electrical storage may comprise a reversible fuel cell; and a storage tank for fuel for the fuel cell or an electrical storage battery, or both connected in parallel.

A plug for connection to electrical mains; a charging circuit for charging the battery from the mains; and electrical conductors for connecting the plug to the charging circuit may be provided.

If water is used, the energy source can further comprise a first connector for removing steam generated in the cooling jacket so that the steam can be used as an energy source; and a second connector for returning water to the cooling jacket to replace water turned to steam that has been removed for use as an energy source.

The energy source can also further comprise an electrical connector electrically connected to the generator to allow the output of the generator to power an external load.

The invention is also directed to a method for operating an energy source comprising running an internal combustion engine so as to utilizing waste heat to generate the vapor of a working medium; utilizing the vapor to power a turbine connected to receive the vapor; rotating a generator in response to output of the turbine to generate electricity; and using at least a portion of the electricity generated by the generator to heat a heating coil disposed to heat the working medium.

The method can further comprise charging an electrical storage with utilizing the electricity generated by the generator to power an external load such as a building.

At least a portion of the steam may be used for heating, for example, a building.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
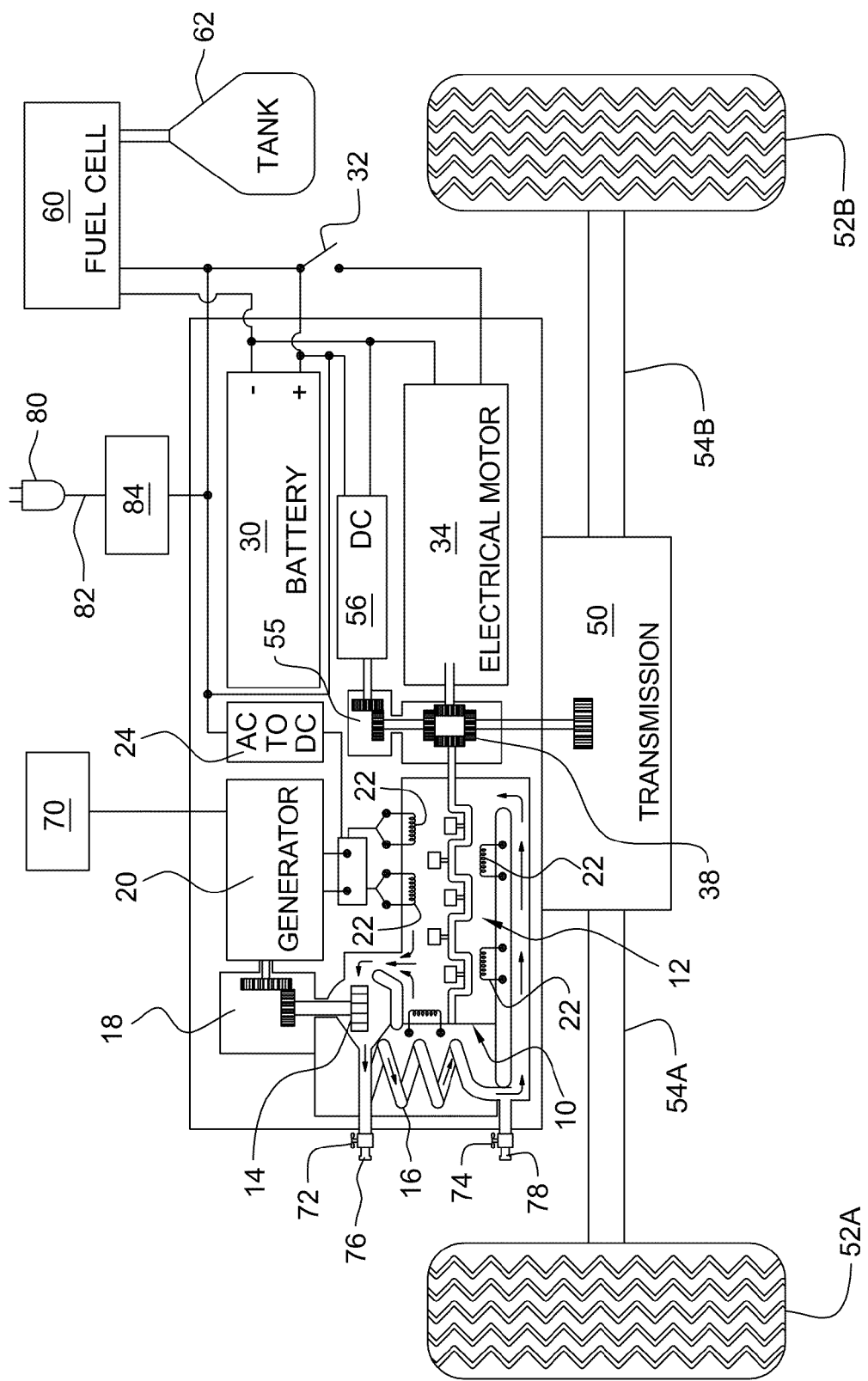
FIG. 1 is a schematic diagram of an apparatus in accordance with the invention.

Referring to FIG. 1, there is shown an internal combustion engine 10 incorporating features of the present invention, and connected to a number of different components. Although the present invention will be described with reference to the single embodiment shown in the drawings, it should be understood that the present invention can be embodied in many alternate forms of embodiments. In addition, any suitable size, shape or type of elements or materials could be used.

Internal combustion engine 10 may be fueled with liquids such as diesel fuel, gasoline or ethanol, or may be fueled by gaseous combustibles such as, for example, propane, in any manner well know in the art, or by hydrogen. Internal combustion engine 10 differs from most common engines in that it has a cooling jacket 12 around its cylinders that is filled to some level such as an intermediate level with a working medium such as a refrigerant or water, or other coolant that is designed to boil when engine 10 is operating, with the steam or vapor being used to power a vapor driven engine or turbine 14. Refrigerants may be any one of a number of commercially available types such as R12, R404A or R134a, as long as it can withstand the temperatures to which it is exposed without decomposing. After being utilized in turbine 14, the steam or vapor is routed to a condenser 16, which may be, for example air cooled, where it is condensed, and fed back into cooling jacket 12.

Turbine 14, by way of a gear reduction drive 18, rotates the shaft of an AC generator or alternator 20, which may produce 20,000 watts or more of electrical energy. Advantageously, some of this electrical energy is used to power one or more heating coils 22, within cooling jacket 12, to generate additional steam or vapor, as may be required.

The output of generator or alternator 20 is connected to an AC to DC converter 24, which produces a voltage required to charge a large battery 30. At appropriate times, such as when an electrical assist is required, and as determined by whether a switch 32 is closed, electrical energy is supplied to an electric motor 34. The shaft of electric motor 34 is coupled to a dual input gear drive 38, which has as its other input the crankshaft of internal combustion engine 10. An output of dual input gear drive 38 is coupled to a transmission 50, such as the transmission of a motor vehicle. Transmission 50 may drive a wheels 52a and 52b, via respective axles 54a and 54b, as is well known.

Another output of dual input gear drive 38 is coupled to a gear drive 55 for a small DC generator 56, that may serve to charge battery 30. For example, when the vehicle is being slowed down, the rotation of wheels 52A and 52B, via dual input gear drive 38, and gear drive 55, may cause DC generator 56 to rotate at a speed sufficient to charge battery 30 by so called dynamic braking, thus recovering energy that would otherwise be dissipated as heat in a vehicle's brakes.

A reversible hydrogen fuel cell 60 may also be connected generally parallel to battery 30. As an alternative, a water tank may provide a source of water to be converted to oxygen and hydrogen by electrolysis. The water tank (not shown) may also provide a source of water to be converted into steam, for use in the system. In situations where excess electrical energy is being generated, such as when there is no need for an assist from motor 34, electrical energy is used to separate water into hydrogen and oxygen. When additional electrical energy is required, such as in situations when fuel for internal combustion engine 10 is temporarily in short supply, or when battery 30 is low in energy, and an energy boost may be required, then the separated hydrogen and oxygen may be re-combined in fuel cell 60 to provide electrical energy. As an alternative, hydrogen fuel cell 60 need not be reversible, if a supplemental, pressured hydrogen tank 62 is provided. This may be a separate tank, or hydrogen may be provided from a larger tank, or compartment therein (both not shown) also used fuel internal combustion engine 10.

Advantageously, the apparatus of the invention may also be used to supply energy to, or receive energy from, a permanent structure such as a house or other building. Generator 20 may provide a voltage output which may be supplied via a transformer (not shown) to a connector 70, directly to home wiring, to supply electrical energy in the event that power from the usual electrical grid is not available due to, for example, downed power lines, as a result of ice or high winds, which have toppled trees on to the lines. It will be understood that the power grid is disconnected from the house while the apparatus in accordance with the invention provides electrical energy to power the house, and reconnected when power from the grid is restored, at which time the apparatus of the invention is no longer connected to the house for purposes of providing power to the house.

In cases where it is advantageous to port steam to the house, such as for heating, heat produced by the running of internal combustion engine 10 facilitates the generation of steam from water. The heating coils 22, within cooling jacket 12, are also used to generate steam. The steam may be ported to the house with a suitable quick connect and disconnect insulated pipe (not shown) connected to a fitting 76 under the control of a valve 72, and condensed water vapor may be ported back to the cooling jacket 12, with a suitable pump (not shown), via another insulated quick connect and disconnect pipe (not shown) via a fitting 78 under the control of a valve 74.

The apparatus of the invention may also be charged from household, or other sources, when power is available. A plug 80, connected to a line cord 82 of suitable current carrying capacity, supplies electrical energy to a charging circuit 84, which is used to charge battery 30. The use of fuel may be reduced by charging the apparatus of the invention from the power grid, especially at time of low energy demand, such as during night-time hours. It has been estimated that with current battery technology, almost one third of the automobiles in the United States may be charged from the existing power grid with sufficient energy so that the first thirty to forty miles of travel each day uses no on-board fuel. Charging may be accomplished by simply connecting to the power grid at a home or other suitable building, or infrastructure, such as parking meter style charging stations, that collect a fee for charging, may be provided.

Thus, the present invention provides a flexible system for use in motor vehicles, that utilizes energy in an efficient and flexible manner, with a high percentage efficiency to provide for the motive needs of the vehicle, or to provide for the needs of a building adjacent the vehicle, thus maintaining the living conditions in a dwelling even when the power grid is not supplying necessary electrical energy.

It should be understood that the foregoing description is only illustrative of the invention. Various alternatives and modifications can be devised by those skilled in the art without departing from the invention. Accordingly, the present invention is intended to embrace all such alternatives, modifications and variances.

What is claimed is:

1. An energy source comprising:
    an internal combustion engine configured to utilize waste heat to generate vapor from a working medium, said internal combustion engine having a cooling jacket for containing the working medium for generating said vapor;
    a turbine connected to receive the vapor and having a rotating component rotated by the passage of the vapor;
    a generator rotated in response to rotation of the rotating component to generate electricity; and
    a heating coil powered by electricity produced by the generator, the heating coil being disposed to heat the medium in the cooling jacket to assist in providing vapor.

2. The energy source of claim 1, wherein the cooling jacket contains a working medium comprising water for generating a vapor comprising steam.

3. The energy source of claim 1, wherein the internal combustion engine comprises cylinders in which fuel is consumed, and the cooling jacket cools the cylinders.

4. The energy source of claim 1, further comprising:
electrical energy storage for storing electrical energy produced by the generator;
an electrical motor powered by electrical energy from the electrical storage; and
a transmission for receiving drive power from both the internal combustion engine and the electrical motor so as to provide rotational drive energy from the energy source.

5. The energy source of claim 4, wherein said generator produces an alternating current, further comprising an A.C. to D.C. converter for converting said alternating current to direct current.

6. The energy source of claim 4, wherein the transmission is configured to provide drive energy to drive axles for driving wheels of a motor vehicle.

7. The energy source of claim 6, further comprising:
a second electrical generator;
a drive gear arrangement for driving said second electrical generator in response to rotation of said drive axles; and
electrical connections for connecting output of said second generator to said battery to charge said battery upon dynamic braking of a motor vehicle having wheels driven by said drive axles.

8. The energy source of claim 7, wherein said drive gear arrangement comprises:
a first rotational input connected to a drive shaft of the internal combustion engine;
a second rotational input connected to the electrical motor;
a first output connected to the transmission; and
a second output connected to the gear drive arrangement.

9. The energy source of claim 4, wherein the electrical storage comprises:
a reversible fuel cell; and
a storage tank for fuel for said fuel cell.

10. The energy source of claim 4, wherein the electrical storage comprises an electrical storage battery.

11. The energy source of claim 4, further comprising:
a fuel cell connected in parallel with said battery; and
a storage tank for storing fuel for said fuel cell.

12. The energy source of claim 4, further comprising:
a plug for connection to electrical mains;
a charging circuit for charging said battery from said mains; and
electrical conductors for connecting said plug to said charging circuit.

13. The energy source of claim 1, further comprising:
a first connector for removing steam generated in the cooling jacket when water is therein so that the steam can be used as an energy source; and
a second connector for returning water to the cooling jacket to replace water turned to steam that has been removed for use as an energy source.

14. The energy source of claim 1, further comprising:
an electrical connector electrically connected to the generator to allow the output of the generator to power an external load.

15. A method for operating an energy source comprising:
running an internal combustion engine having a cooling jacket so as to utilize waste heat to generate a vapor of a working medium in the cooling jacket;
utilizing the vapor to power a turbine connected to receive the vapor;
rotating a generator in response to output of the turbine to generate electricity; and
using at least a portion of the electricity generated by the generator to heat a heating coil disposed in the cooling jacket to heat the working medium to provide vapor.

16. The method of claim 15, further comprising:
charging an electrical storage utilizing the electricity generated by the generator.

17. The method of claim 15, further comprising:
utilizing the electrical energy generated by said generator to power an external load.

18. The method of claim 17, wherein the energy source is used to power a motor vehicle, and the external load is a building.

19. The method of claim 15, wherein the medium comprises water and at least a portion of the vapor is steam that is used for heating.

20. The method of claim 19, wherein the portion of the steam that is used for heating is used to heat a building.

* * * * *